(12) United States Patent
Innami et al.

(10) Patent No.: US 7,973,423 B2
(45) Date of Patent: Jul. 5, 2011

(54) ON-VEHICLE ELECTRIC POWER SOURCE SYSTEM

(75) Inventors: Toshiyuki Innami, Mito (JP); Kimio Nishino, Hitachinaka (JP); Kenichiro Matsubara, Kasumigaura (JP); Toshiharu Sugawara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 360 days.

(21) Appl. No.: 12/351,150

(22) Filed: Jan. 9, 2009

(65) Prior Publication Data
US 2009/0179627 A1 Jul. 16, 2009

(30) Foreign Application Priority Data
Jan. 11, 2008 (JP) .................. 2008-003883

(51) Int. Cl.
*B60L 1/00* (2006.01)
*B60L 3/00* (2006.01)
*H02G 3/00* (2006.01)
(52) U.S. Cl. ..................................... 307/10.1
(58) Field of Classification Search ............... 307/9.1, 307/10.1; 180/65.275
See application file for complete search history.

(56) References Cited

U.S. PATENT DOCUMENTS
2006/0097577 A1 * 5/2006 Kato et al. ................. 307/10.1

FOREIGN PATENT DOCUMENTS
JP 2005-261180 A 9/2005

* cited by examiner

*Primary Examiner* — Jared J Fureman
*Assistant Examiner* — Carlos Amaya
(74) *Attorney, Agent, or Firm* — Foley & Lardner LLP

(57) ABSTRACT

In an on-vehicle electric power source system, a power source control device is configured to supply an electric power from an electric power supply source to an actuator by means of a dual-circuit power supply line. The dual-circuit power supply line includes a bypass line and a charge-up line arranged in parallel with the bypass line. A first shut-off circuit is disposed in the bypass line. A booster circuit, an electricity storage device, and a second shut-off circuit are disposed in the charge-up line. The storage device is provided for storing an electric power boosted up by the booster circuit. Also provided is a control unit, which is configured to perform switching between an electric power supply through the bypass line and an electric power supply through the charge-up line by a changeover of a shutoff-circuit established/ blocked state between the first and second shut-off circuits.

20 Claims, 5 Drawing Sheets

ON-VEHICLE ELECTRIC POWER SOURCE SYSTEM

TECHNICAL FIELD

The present invention relates to an on-vehicle electric power source system for a brake control apparatus configured to produce a braking force by wheel-brake cylinder pressure control, and specifically to an electric power source system suited to a brake-by-wire (BBW) control system configured to perform wheel-brake cylinder pressure control by the use of electrical loads, for example an electric motor or a motor generator, solenoid-operated valve components and the like, regardless of a driver's braking-pedal depressing force.

BACKGROUND ART

Generally, an on-vehicle electric power source system includes an electric power source and a high-voltage circuit connected to the power source in parallel. The electric power source and the high-voltage circuit are both connected to an actuator (e.g., an electric motor used for an electric motor-assist power steering (EPS) system or an electric brake). Only when a steering wheel is turned to a left turn limit or to a right turn limit and thus a great steering-assist torque, in other words, a large electric power, is required, a voltage rise or a boost-up operation is made by means of- the high-voltage circuit, as required for an adequately large electric power. One such on-vehicle electric power source system has been disclosed in Japanese Patent Provisional Publication No. 2005-261180 (hereinafter is referred to as "JP2005-261180").

SUMMARY OF THE INVENTION

However, in such an on-vehicle electric power source system as disclosed in JP2005-261180, there is a risk that a lack of voltage occurs and thus a required electric power output cannot be obtained even during a boost-up operation, due to a source voltage drop or an electric-power source system failure in the presence of an output of an actuator drive-current command.

It is, therefore, in view of the previously-described disadvantages of the prior art, an object of the invention to provide an on-vehicle electric power source system configured to produce a required electric power output even when a source voltage drop occurs.

In order to accomplish the aforementioned and other objects of the present invention, an on-vehicle electric power source system comprises an on-vehicle electric power supply source, an actuator driven by an electric power from the electric power supply source, a power source control device provided between the electric power supply source and the actuator for controlling an electric current to be supplied to the actuator, and a control unit configured to control both the power source control device and the actuator, wherein the power source control device is further configured to supply the electric power from the electric power supply source to the actuator by means of a dual-circuit power supply line, wherein the dual-circuit power supply line comprises a bypass line and a charge-up line arranged in parallel with the bypass line, and wherein a first shut-off circuit is disposed in the bypass line, whereas a booster circuit, an electricity storage device, and a second shut-off circuit are disposed in the charge-up line.

According to another aspect of the invention, an on-vehicle electric power source system for an automotive vehicle comprises an on-vehicle electric power supply source, an actuator driven by an electric power from the electric power supply source, and a power source control device provided between the electric power supply source and the actuator for controlling an electric current to be supplied to the actuator, wherein the-power source control device is further configured to supply the electric power from the electric power supply source to the actuator by means of a dual-circuit power supply device, the dual-circuit power supply device comprises at least a bypass device and a charge-up device arranged in parallel with the bypass device, a first shut-off device is disposed in the bypass device, whereas a booster device, an electricity storage device, and a second shut-off device are disposed in the charge-up device, the electricity storage device is provided for storing an electric power boosted up by the booster device, the charge-up device is connected to the bypass device in front and in rear of the first shut-off device, the electric power is supplied through the bypass device to the actuator during a startup of the electric power source system, and the electric power is supplied through the charge-up device to the actuator when a voltage of the electricity storage device exceeds a voltage of the electric power supply source.

According to a further aspect of the invention, a method of supplying an electric power, in an on-vehicle electric power source system, the method comprises providing a bypass line that connects an electric power supply source with an actuator, providing a charge-up line, which is arranged in parallel with the bypass line and configured such that an electric power produced through the charge-up line is boosted up by a booster circuit, disposing an electricity storage device in the charge-up line for storing the electric power boosted up by the booster circuit, and initiating an electric power supply through the charge-up line after termination of an electric power supply through the bypass line.

The other objects and features of this invention will become understood from the following description with reference to the accompanying drawings.

DESCRIPTION OF THE PREFERRED EMBODIMENTS

First Embodiment

Figure 1:
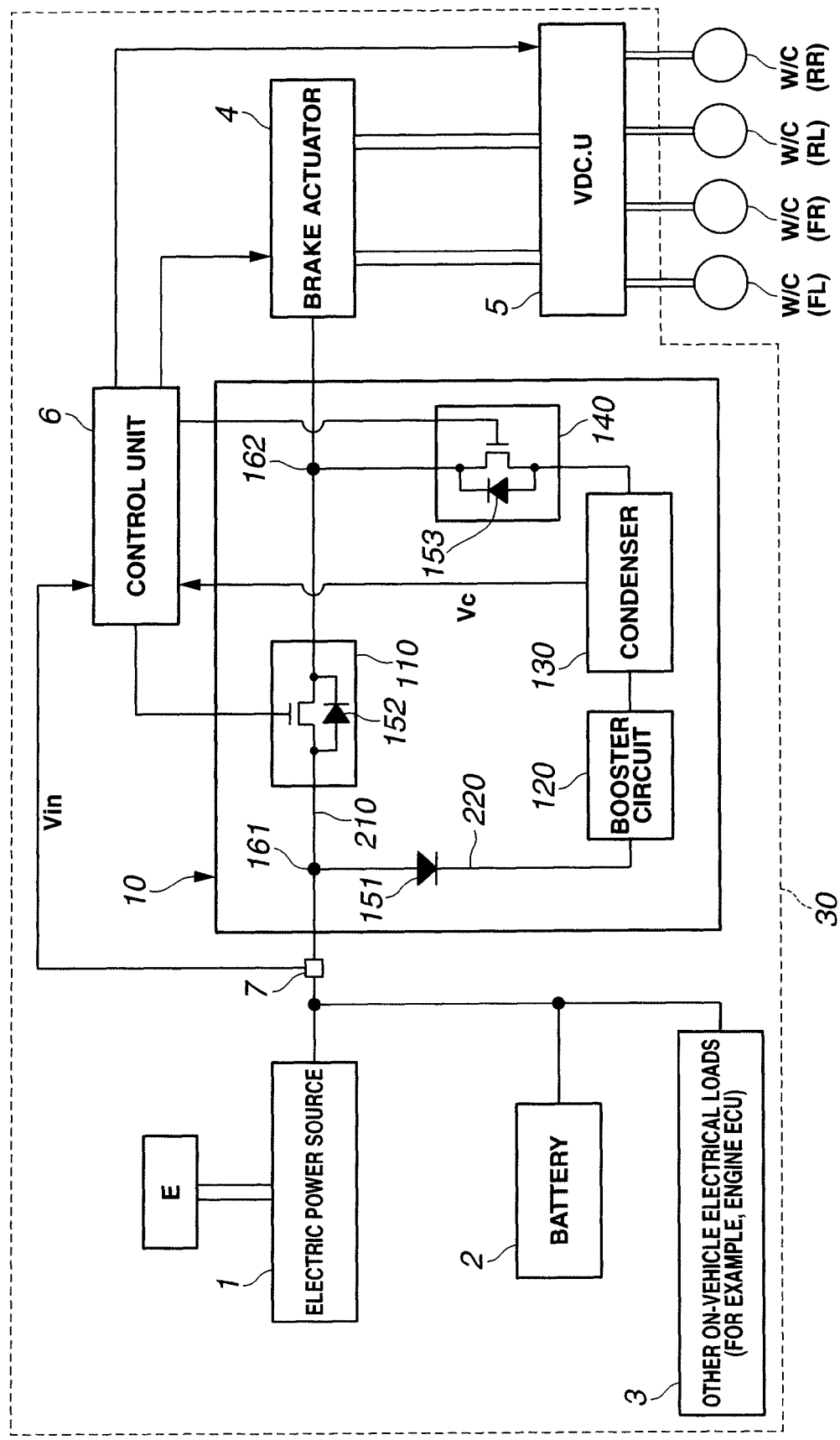
FIG. 1 is a system diagram illustrating a first embodiment of an on-vehicle electric power source system, which is applied to an automotive brake control system.

Referring now to the drawings, particularly to FIG. 1, the on-vehicle electric power source system of the first embodiment is exemplified in a brake control system for a four-wheeled automotive vehicle, which is configured to execute vehicle dynamics control (VDC) by wheel-brake cylinder pressure control.

[System Configuration]

As seen from the system configuration of the brake control system combined with an electric power source control device 10 incorporated in the on-vehicle electric power source system of the first embodiment of FIG. 1, the brake control system includes an electric power source 1 (e.g., a generator, a motor generator, or a DC/DC converter), a battery 2, other on-vehicle electrical loads (e.g., an engine electronic control unit (ECU) and the like), a brake actuator 4, and a VDC unit 5. Except for front-left, front-right, rear-left and rear-right wheel-brake cylinders W/C(FL)-W/C(RR), the brake control system components are all arranged in an engine room 30 of the vehicle.

Electric power source 1 (e.g., a generator, a motor generator, or a DC/DC converter) is connected to an engine E. The output terminal of power source 1 and the output terminal of battery 2 are both connected to power source control device 10, for the purpose of electric power supplies. The other on-vehicle electrical loads 3 are connected to the on-vehicle electric power source system, in parallel with an electric power supply source, that is, in parallel with each of electric power source 1 and battery 2.

Power source control device 10 is configured to output a supplied electric power to brake actuator 4. Brake actuator 4 is a hydraulic actuator, which produces hydraulic pressure by means of an electric motor (a pump motor). Actually, brake actuator 4 is configured to produce a hydraulic pressure in response to a control command, which is generated from a control unit 6 and determined based on information inputted into control unit 6, such as vehicle speed and the like. The produced hydraulic pressure is outputted from brake actuator 4 to VDC unit 5, for vehicle dynamics control achieved through wheel-brake cylinder pressure control.

VDC unit 5 is an actuator (or a hydraulic modulator) configured to achieve vehicle dynamics control with braking system interaction. VDC unit 5 is provided to control or regulate the hydraulic pressure outputted from brake actuator 4 responsively to a control command from control unit 6, and also provided to output the properly controlled or regulated hydraulic pressure to each of wheel-brake cylinders W/C(FL)-W/C(RR).

Control unit 6 is configured to control, based on input information such as vehicle speed and the like, the operations of brake actuator 4 and VDC unit 5. Control unit 6 is also configured to compare a voltage supplied from the electric power supply source (both electric power source 1 and battery 2) to power source control device 10 with a voltage across an electrical condenser 130 (i.e., a capacitor) included in electric power source control device 10. The voltage supplied from the electric power supply source to power source control device 10 will be hereinafter referred to as "vehicle voltage Vin". On the other hand, the voltage across condenser 130 will be hereinafter referred to as "condenser voltage Vc". Control unit 6 is further configured to control, based on the comparison result of vehicle voltage Vin and condenser voltage Vc, an ON/OFF state of a first shut-off circuit 110 and an ON/OFF state of a second shut-off circuit 140. The ON state of first shut-off circuit 110 means its closed state (an established circuit state), whereas the OFF state of first shut-off circuit 110 means its open state (a shut-off or blocked circuit state). In a similar manner, the ON state of second shut-off circuit 140 means its closed state, whereas the OFF state of second shut-off circuit 140 means its open state. In the system of the first embodiment shown in FIG. 1, vehicle voltage Vin is detected by means of a voltage detector 7, which is located upstream of power source control device 10.

[On-Vehicle Electric Power Source System]

Power source control device 10 includes first shut-off circuit 110, a booster circuit 120, electrical condenser 130, and second shut-off circuit 140. First shut-off circuit 110 is connected to control unit 6, such that switching between ON and OFF states of first shut-off circuit 110 is done responsively to a command from control unit 6. Similarly, second shut-off circuit 140 is connected to control unit 6, such that switching between ON and OFF states of second shut-off circuit 140 is done responsively to a command from control unit 6. In the shown embodiment, condenser 130 is used as a storage device of electricity (or an electrical energy storage device). Condenser 130 may be replaced by a storage battery, which battery is added to a charge-up line 220 (described later) in place of condenser 130 and serves as a separate electrical energy storage device, differing from battery 2.

First shut-off circuit 110 is disposed in a bypass line 210, through which electric power source 1 and brake actuator 4 are connected to each other. On the other hand, booster circuit 120, condenser 130, and second shut-off circuit 140 are disposed in charge-up line 220, which is arranged in parallel with bypass line 210. More concretely, charge-up line 220 is connected to bypass line 210 in parallel at two connection points (two nodes), namely, a first node 161 upstream of first shut-off circuit 110 and a second node 162 downstream of first shut-off circuit 110 (i.e., on the side of brake actuator 4).

A diode 151 is disposed in charge-up line 220 and arranged upstream of booster circuit 120. A diode 152 is disposed in first shut-off circuit 110, whereas a diode 153 is disposed in second shut-off circuit 140. As is generally known, each of these diodes has a function similar to a current check valve that passes electric current in one direction, but blocks or prevents current flow in the other direction (in the reverse direction).

Booster circuit 120 is configured to boost up the supplied electric power, and connected to condenser 130 such that condenser 130 is charged by the boosted-up electric power. Condenser 130 is designed so that the upper limit Vcmax of condenser voltage Vc is greater than vehicle voltage Vin supplied from the electric power supply source (i.e., electric power source 1 and battery 2), that is to say, Vcmax>Vin.

(Power Supply through Bypass Line)

At a bypass-line power supply operating mode where first shut-off circuit 110 is turned ON and kept closed and second shut-off circuit 140 is turned OFF and kept open, vehicle voltage Vin is supplied to brake actuator 4 as a supply voltage Vout. Additionally, during the bypass-line power supply mode, condenser 130 is charged.

(Power Supply through Charge-Up Line)

At a charge-up-line power supply operating mode where first shut-off circuit 110 is turned OFF and kept open and second shut-off circuit 140 is turned ON and kept closed to shut off bypass line 210, thereby blocking or shutting off electric-current flow through bypass line 210. As a result, the condenser voltage Vc, whose level is boosted up by means of booster circuit 120 of charge-up line 220, is delivered to brake actuator 4 as supply voltage Vout. During the charge-up-line power supply mode, condenser 130 is kept in its electric discharge state.

By virtue of the boost-up operation of booster circuit 120, during the charge-up-line power supply mode, supply voltage Vout can be set or raised up to a higher level than vehicle voltage Vin, beforehand.

The minimum guaranteed operating voltage of brake actuator 4 is set to be less than or equal to a battery voltage Vb, but supply voltage Vout is boosted up to a voltage level higher than vehicle voltage Vin, which voltage Vin is higher than battery voltage Vb. Thus, it is possible to provide a great voltage-drop margin for brake actuator 4. Hence, even when brake actuator 4 is driven (activated) and then a drop of supply voltage Vout occurs, the on-vehicle electric power source system of the embodiment insures the operation of brake actuator 4.

(Charging/Discharging of Condenser)

Condenser 130 is in its charge state, when second shut-off circuit 140 is kept in its OFF state or when brake actuator 4 is kept inoperative (deactivated). Therefore, during the bypass-line power supply mode through the use of bypass line 210, condenser 130 becomes charged.

In contrast, discharging action of condenser 130 is made, under a specific condition where brake actuator 4 is kept operative (activated) and second shut-off circuit 140 is kept in its ON state and first shut-off circuit 110 is kept in its OFF state. Hence, during the charge-up-line power supply mode through the use of charge-up line 220, condenser 130 becomes discharged.

[Power-Supply-Line Switching Control Flow]

Figure 2:
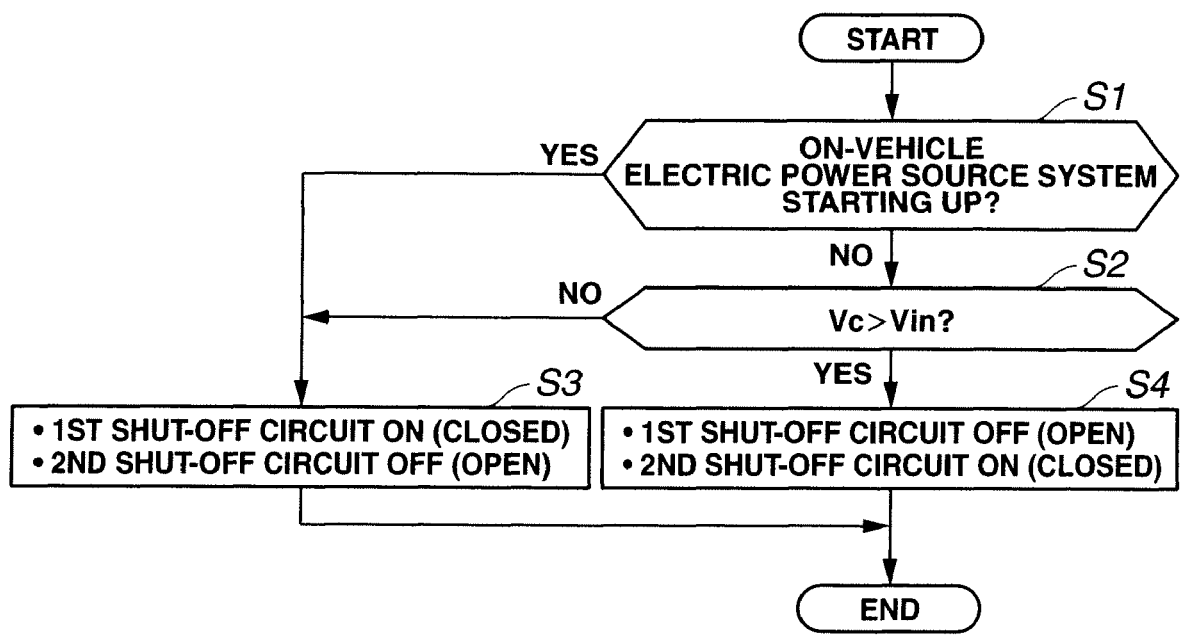
FIG. 2 is a flowchart illustrating a power-supply-line switching control routine used to switch between a bypass-line power supply operating mode and a charge-up-line power supply operating mode.

Referring now to FIG. 2, there is shown the power-supply-line switching control routine used to switch an electric power supply through bypass line 210 and an electric power supply through charge-up line 220.

At step S1, a check is made to determine whether the on-vehicle electric power source system is starting up. When the answer to step S1 is in the affirmative (YES), that is, during the system start-up, the routine proceeds from step S1 to step S3. Conversely when the answer to step S1 is in the negative (NO), the routine proceeds from step S1 to step S2.

At step S2, a check is made to determine whether condenser voltage Vc is greater than vehicle voltage Vin. When the answer to step S2 is affirmative, that is, in case of Vc>Vin, the routine proceeds to step S4. Conversely when the answer to step S2 is negative, that is, in case of Vc<Vin, the routine proceeds to step S3.

At step S3, first shut-off circuit 110 is turned ON and kept closed, and simultaneously second shut-off circuit 140 is turned OFF and kept open. Thus, the electric power supply through bypass line 210, in other words, the bypass-line power supply mode is initiated. As a result, vehicle voltage Vin is delivered to brake actuator 4 as supply voltage Vout, that is, Vin=Vout. In this manner, one execution cycle terminates.

At step S4, first shut-off circuit 110 is turned OFF and kept open, and simultaneously second shut-off circuit 140 is turned ON and kept closed. Thus, the electric power supply through charge-up line 220, in other words, the charge-up-line power supply mode is initiated. As a result, condenser voltage vc is delivered to brake actuator 4 as supply voltage Vout, that is, Vc=Vout. In this manner, one execution cycle terminates.

[Time Chart for Power-Supply-Line Switching Control]

Figure 3:
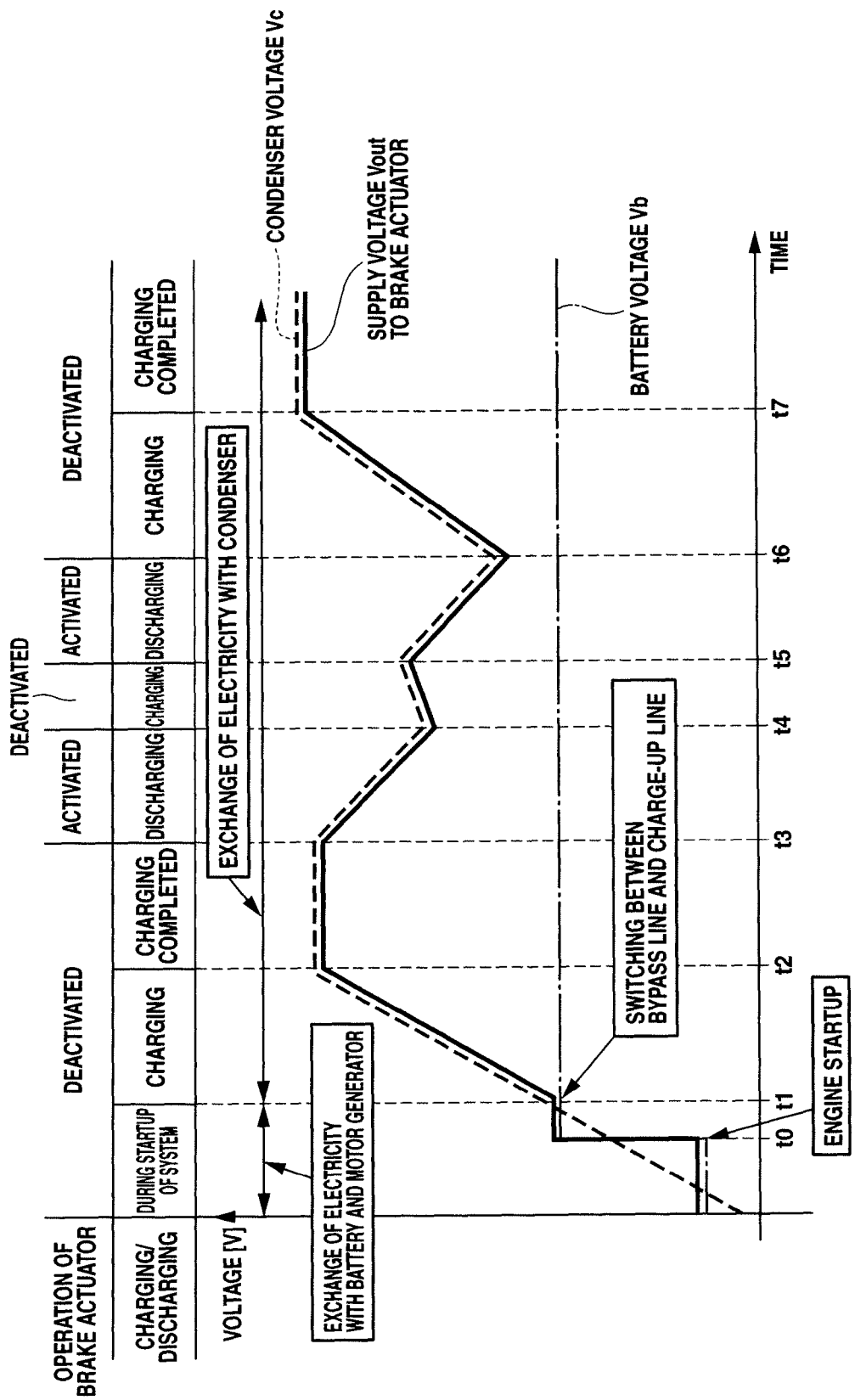
FIG. 3 is a time chart illustrating the operation of the power-supply-line switching control shown in FIG. 2.

Referring to FIG. 3, there is shown the time chart concerning the power-supply-line switching control.

(Time t0)

At the time t0, engine E starts up. At this point of time, the on-vehicle electric power source system is starting up. At the time t0, supply voltage Vout, delivered from the power source system to brake actuator 4, becomes less than vehicle voltage Vin, that is, Vout<vin. Hence, the power source system operates at the bypass-line power supply mode to permit the electric power supply through bypass line 210 to brake actuator 4 (see the flow from step S1 to step S3 in the flowchart of FIG. 2).

(Time t1)

At the time t1, the startup of the power source system has been completed. At this point of time, supply voltage vout, delivered to brake actuator 4, becomes greater than vehicle voltage Vin, that is, Vout>Vin, and almost at the same time condenser voltage vc becomes greater than vehicle voltage Vin, that is, Vc>Vin. Thus, first shut-off circuit 110 becomes turned OFF and kept open, and simultaneously second shut-off circuit 140 becomes turned ON and kept closed. As a result, as the supply voltage Vout to brake actuator 4, the delivery of condenser voltage Vc starts, that is, Vc=Vout. Hence, the power source system begins to operate at the charge-up-line power supply mode to permit the electric power supply through charge-up line 220 to brake actuator 4 (see the flow from step S1 via step S2 to step S4 in the flowchart of FIG. 2). At the time t1, brake actuator 4 is kept inoperative (deactivated), and thus condenser 130 is conditioned in its charge state. As discussed previously, condenser 130 is designed so that the condenser-voltage upper limit Vcmax is greater than vehicle voltage Vin. Therefore, from the time t1, the condenser charging action tends to further develop. That is to say, condenser voltage Vc continues to rise even after condenser voltage Vc has exceeded vehicle voltage Vin.

(Time t2)

At the time t2, condenser voltage Vc becomes reached its upper limit Vcmax, and thus the charging action of condenser 130 has been completed.

(Time t3)

At the time t3, a transition of brake actuator 4 from inoperative (deactivated) to operative (activated) occurs. Owing to brake actuator 4 activated, a transition of condenser 130 from its charging state to its discharging state occurs. Thus, a drop of condenser voltage Vc (i.e., a drop of supply voltage Vout) occurs. However, in the case of the power source system of the embodiment, supply voltage Vout (that is, condenser voltage Vc) is raised up to a high voltage level, beforehand, by means of booster circuit 120, and thus a great voltage-drop margin for brake actuator 4 can be assured. Regardless of a supply-voltage drop from the time t3, the power source system of the embodiment ensures the operation of brake actuator 4.

(Time t4)

At the time t4, a transition of brake actuator 4 to inoperative (deactivated) occurs. Owing to brake actuator 4 deactivated again, a transition of condenser 130 to its charging state occurs.

(Time t5)

At the time t5, a transition of brake actuator 4 to operative (activated) occurs. Owing to brake actuator 4 activated again, a transition of condenser 130 to its discharging state occurs, such that a drop of condenser voltage Vc (i.e., a drop of supply voltage Vout) occurs. In a similar manner to the point of time t3, regardless of a supply-voltage drop from the time t5, the power source system of the embodiment ensures the operation of brake actuator 4.

(Time t6)

At the time t6, a transition of brake actuator 4 to inoperative (deactivated) occurs. In a similar manner to the point of time t4, owing to brake actuator 4 deactivated again, the charging action of condenser 130 starts again.

(Time t7)

Condenser voltage Vc becomes again reached its upper limit Vcmax at the time t7 (similar to reaching the condenser-voltage upper limit Vcmax at the point of time t2), and thus the charging action of condenser 130 has been completed.

Effects of First Embodiment (1) The on-vehicle electric power source system of the embodiment includes an electric power supply source (i.e., on-vehicle electric power source 1 and battery 2), brake actuator 4 driven by an electric power from electric power source 1 and battery 2, power source control device 10 provided between (a) the electric power source 1 and battery 2 and (b) the brake actuator 4 for controlling an electric current to be supplied to brake actuator 4, and control unit 6 configured to control both power source control device 10 and brake actuator 4. The previously-noted power source control device 10 is further configured to supply the electric power from electric power source 1 and battery 2 to brake actuator 4 by means of a dual-circuit power supply line. The dual-circuit power supply line is comprised of bypass line 210 and charge-up line 220 arranged in parallel with bypass line 210. First shut-off circuit 110 is disposed in bypass line 210, whereas booster circuit 120, an electricity storage device (e.g., condenser 130), and second shut-off circuit 140 are disposed in charge-up line 220. The above-mentioned electricity storage device (e.g., condenser 130) is provided for storing an electric power boosted up by booster circuit 120. Control unit 6 is further configured to perform switching between an electric power supply through bypass line 210 and an electric power supply through charge-up line 220 by a changeover of a shutoff-circuit established/blocked state between first and second shut-off circuits 110 and 140.

With the previously-noted arrangement, the electric power, boosted up beforehand, can be supplied through charge-up line 220 to brake actuator 4, and thus it is possible to provide a great voltage-drop margin for brake actuator 4. For the reasons discussed above, even when a drop of supply voltage Vout to brake actuator 4 occurs, by virtue of such a great voltage-drop margin, it is possible to ensure a normal operation of brake actuator 4. Therefore, even when a drop of supply voltage Vout during operation of brake actuator 4, it is possible to effectively suppress the operation of brake actuator 4 from being affected by such a supply-voltage drop. Additionally, the boosted-up electric power contributes to an increased output of brake actuator 4.

(2) Charge-up line 220 is connected to bypass line 210 in front and in rear of first shut-off circuit 110.

(3), (4) Control unit 6 is configured to detect a voltage (Vin) of the electric power supply source (i.e., electric power source 1 and battery 2) and a voltage (vc) of electricity storage device 130. Control unit 6 is configured to establish first shut-off circuit 110 and to block second shut-off circuit 140, during a startup of the electric power source system. Control unit 6 is configured to block first shut-off circuit 110 and to establish second shut-off circuit 140, when the voltage Vc of electricity storage device 130 exceeds the voltage Vin of electric power source 1 and battery 2.

Therefore, it is possible to effectively raise supply voltage Vout after the startup of the electric power source system has been completed.

(5), (8) A voltage across bypass line 210 is a voltage level approximately identical to a voltage (Vin) supplied from electric power source 1 and battery 2, whereas a voltage (Vout) across a portion of charge-up line 220 downstream of booster circuit 120 (i.e., on the side of brake actuator 4) is higher than the voltage (Vin) supplied from electric power source 1 and battery 2.

Therefore, it is possible to provide a great voltage-drop margin for brake actuator 4 by certainly raising supply voltage Vout.

(6) Electricity storage device 130 is comprised of an electrical condenser. Therefore, it is possible to achieve an inexpensive electricity storage configuration. In the case of the use of an electric double layer capacitor as an electricity storage device (electrical condenser 130), it is possible to enhance the life of the electricity storage device.

(7) Electric power source control device 10 is installed in the same vehicle compartment (engine room 30) where brake actuator 4 is installed, and arranged near brake actuator 4.

By installing both electric power source control device 10 and brake actuator 4 in the same vehicle compartment (engine room 30), it is possible to realize a short wiring-harness length between the devices, namely, electric power source control device 10 and brake actuator 4, thus achieving an effectively reduced voltage drop.

(12) The on-vehicle electric power source system of the embodiment includes an electric power supply source (i.e., on-vehicle electric power source 1 and battery 2), brake actuator 4 driven by an electric power from electric power source 1 and battery 2, and power source control device 10 provided between (a) the electric power source 1 and battery 2 and (b) the brake actuator 4 for controlling an electric current to be supplied to brake actuator 4. The previously-noted power source control device 10 is further configured to supply the electric power from electric power source 1 and battery 2 to brake actuator 4 by means of a dual-circuit power supply device (including a dual-circuit power supply line system and other electric elements or devices incorporated in the dual-circuit power supply line system). The dual-circuit power supply device is comprised of at least bypass line 210 and charge-up line 220 arranged in parallel with bypass line 210. First shut-off circuit 110 is disposed in bypass line 210, whereas a booster device (booster circuit 120 or the like), an electricity storage device (e.g., condenser 130), and second shut-off circuit 140 are disposed in charge-up line 220. The above-mentioned electricity storage device (e.g., condenser 130) is provided for storing an electric power boosted up by the booster device (booster circuit 120 or the like). Charge-up line 220 is connected to bypass line 210 in front and in rear of first shut-off circuit 110. During a startup of the electric power source system, the electric power is supplied through bypass line 210 to brake actuator 4. In contrast, when a voltage Vc of electricity storage device 130 exceeds a voltage Vin of electric power source 1 and battery 2, the electric power is supplied through charge-up line 220 to brake actuator 4.

(13) The electric power supply through charge-up line 220 is performed by blocking first shut-off circuit 110 and by establishing second shut-off circuit 140.

(14) A voltage across bypass line 210 is a voltage level approximately identical to a voltage (Vin) supplied from electric power source 1 and battery 2, whereas a voltage (Vout) across a portion of charge-up line 220 downstream of booster circuit 120 (i.e., on the side of brake actuator 4) is higher than the voltage (Vin) supplied from electric power source 1 and battery 2.

(15) Electricity storage device 130 is comprised of an electrical condenser.

(16) Electric power source control device 10 is installed in the same vehicle compartment (engine room 30) where brake actuator 4 is installed, and arranged near brake actuator 4.

(19) In a method of supplying an electric power in the on-vehicle electric source system of the embodiment, the method includes providing bypass line 210 that connects an electric power supply source (i.e., electric power source 1 and battery 2) with brake actuator 4, providing charge-up line 220, which is arranged in parallel with bypass line 210 and configured such that an electric power produced through the charge-up line is boosted up by a booster circuit 120, disposing an electricity storage device (e.g., condenser 130) in charge-up line 220 for storing the electric power boosted up by the booster circuit 120, and initiating an electric power supply through charge-up line 220 after termination of an electric power supply through bypass line 210.

(20) In the method of supplying electric power in the on-vehicle electric source system of the embodiment, the method further includes disposing first shut-off circuit 110 in bypass line 210, disposing second shut-off circuit 140 in charge-up line 220 downstream of the electricity storage device, such as condenser 130 (i.e., on the side of brake actuator 4), establishing first shut-off circuit 110 and blocking second shut-off circuit 140 at an operating mode where the electric power is supplied through bypass line 210, and blocking first shut-off circuit 110 and establishing second shut-off circuit 140 at an operating mode where the electric power is supplied through charge-up line 220.

Second Embodiment

Figure 4:
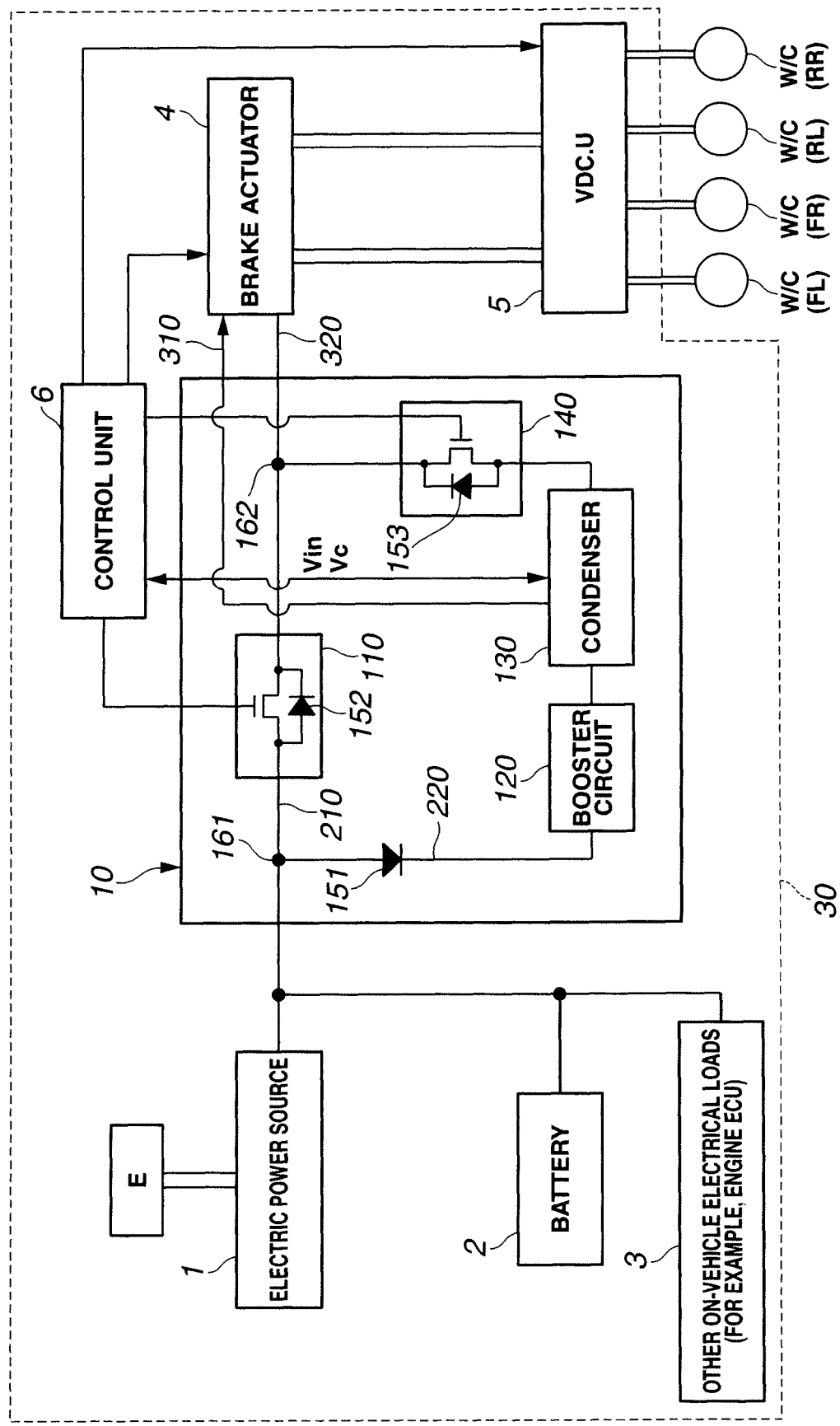
FIG. 4 is a system diagram illustrating a second embodiment of an on-vehicle electric power source system, which is applied to an automotive brake control system.

Referring to FIG. 4, there is shown the system configuration of the on-vehicle electric power source system of the second embodiment. The fundamental system configuration of the second embodiment is similar to that of the first embodiment, except that, in the system of the second embodiment, outputs from power source control device 10 to brake actuator 4 are divided into a signal-system output and an electric-power-system output. Thus, the same reference signs used to designate elements in the system shown in FIG. 1 will be applied to the corresponding elements used in the system of the second embodiment shown in FIG. 4, for the purpose of comparison of the first and second embodiments. Furthermore, in the system of the second embodiment, control unit 6 is also connected to condenser 130 for detecting vehicle voltage Vin via condenser 130, instead of using voltage detector 7 shown in FIG. 1.

As shown in FIG. 4, an electric power line 320 is branched from the second node 162 of bypass line 210 downstream of first shut-off circuit 110 such that electric power line 320 is connected to brake actuator 4. Additionally, brake actuator 4 is connected via a signal line 310 to condenser 130 disposed in charge-up line 220.

Control unit 6 is further configured to determine, based on input information concerning the vehicle voltage Vin detected via condenser 130, whether the state of vehicle voltage Vin, abbreviated to "SOV", is normal or abnormal. Then, control unit 6 outputs a SOV signal (a SOV abnormal signal or a SOV normal signal) indicating the state of the detected vehicle voltage Vin via first shut-off circuit 110 to bypass line 210, and also outputs the SOV signal via second shut-off circuit 140 to charge-up line 220. Concretely, with first shut-off circuit 110 kept closed and second shut-off circuit 140 kept open, the SOV signal is sent from control unit 6 through first shut-off circuit 110, first node 161, diode 151, booster circuit 120, condenser 130, and signal line 310 to brake actuator 4. Conversely, with first shut-off circuit 110 kept open and second shut-off circuit 140 kept closed, the SOV signal is sent from control unit 6 through second shut-off circuit 140, condenser 130, and signal line 310 to brake actuator 4. For instance, when the SOV signal is a SOV abnormal signal indicating an abnormal state of vehicle voltage Vin, the operating mode of brake actuator 4 shifts from a normal operating mode to an energy conservation mode (an electric-power conservation mode) responsively to the SOV abnormal signal. On the other hand, electric-power line 320 is used for electric-power supply through either one of bypass line 210 and charge-up line 220.

Effects of Second Embodiment (11), (17) Power source control device 10 and brake actuator 4 are connected to each other by means of signal line 310, which is provided for outputting the previously-discussed SOV signal (indicating the state of vehicle voltage Vin) to brake actuator 4, as well as electric-power line 320 for electric power supplies to brake actuator 4. Therefore, it is possible to rapidly shift the operating mode of brake actuator 4 to the energy conservation mode (the electric-power conservation mode), when a transition of the state of vehicle voltage Vin shifts from normal (e.g., a sufficient state of charge of battery 2) to abnormal (e.g., an insufficient state of charge of battery 2).

Third Embodiment

Figure 5:
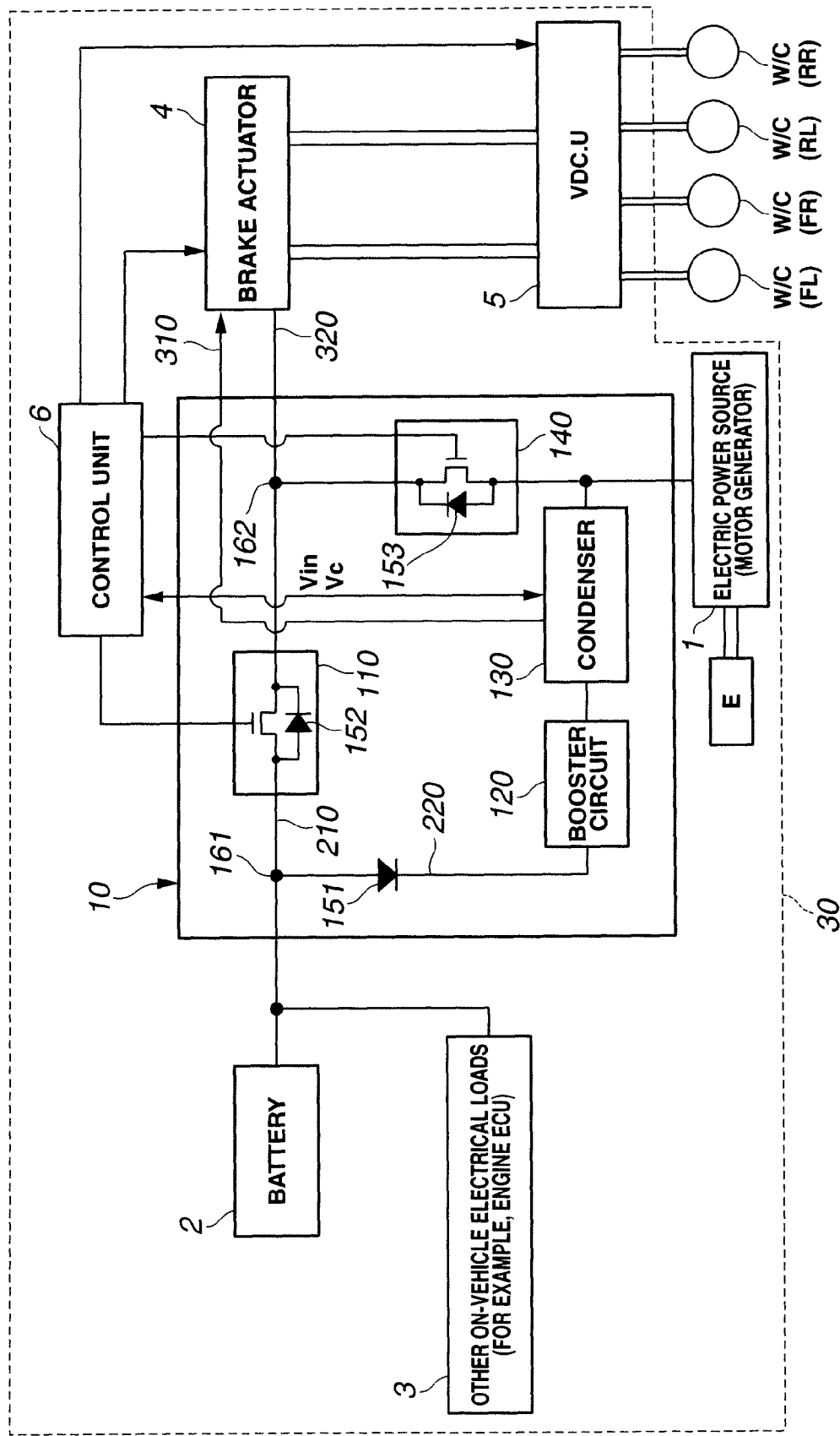
FIG. 5 is a system diagram illustrating a third embodiment of an on-vehicle electric power source system, which is applied to an automotive brake control system.

Referring to FIG. 5, there is shown the system configuration of the on-vehicle electric power source system of the third embodiment. The fundamental system configuration of the third embodiment is very similar to that of the second embodiment, except that, in the system of the third embodiment, electric power source 1 (e.g., a generator, a motor generator, or a DC/DC converter) is relocated. Concretely, instead of connecting the output terminal of power source 1 to the first node 161 of bypass line 210 and charge-up line 220, in the system of the third embodiment, the output terminal of electric power source 1 is connected to a portion of charge-up line 220 between condenser 130 and second shut-off line 140. In the system of the third embodiment, power source 1 is a motor generator, which is installed on a hybrid vehicle configured to use both a power produced by power source 1 (the motor generator) and a power produced by engine E.

In the case of the system of the third embodiment, an electric power, boosted up by booster circuit 120, can be supplied to power source 1 (the motor generator of the hybrid vehicle). Thus, it is possible to easily smoothly start up the engine E at high voltages, thus enhancing the startability of the hybrid vehicle.

The entire contents of Japanese Patent Application No. 2008-003883 (filed Jan. 11, 2008) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An on-vehicle electric power source system comprising:
an on-vehicle electric power supply source;
an actuator driven by an electric power from the electric power supply source;
a power source control device provided between the electric power supply source and the actuator for controlling an electric current to be supplied to the actuator; and
a control unit configured to control both the power source control device and the actuator,
wherein the power source control device is further configured to supply the electric power from the electric power supply source to the actuator by means of a dual-circuit power supply line, wherein the dual-circuit power supply line comprises a bypass line and a charge-up line arranged in parallel with the bypass line, and wherein a first shut-off circuit is disposed in the bypass line, whereas a booster circuit, an electricity storage device, and a second shut-off circuit are disposed in the charge-up line.

2. The on-vehicle electric power source system as claimed in claim 1, wherein:

the charge-up line is connected to the bypass line in front and in rear of the first shut-off circuit.

3. The on-vehicle electric power source system as claimed in claim 2, wherein:

the control unit is further configured to:
  detect a voltage of the electric power supply source and a voltage of the electricity storage device;
  establish the first shut-off circuit and block the second shut-off circuit during a startup of the electric power source system; and
  block the first shut-off circuit and establish the second shut-off circuit, when the voltage of the electricity storage device exceeds the voltage of the electric power supply source.

4. The on-vehicle electric power source system as claimed in claim 1, wherein:

the control unit is further configured to:
  detect a voltage of the electric power supply source and a voltage of the electricity storage device;
  establish the first shut-off circuit and block the second shut-off circuit during a startup of the electric power source system; and
  block the first shut-off circuit and establish the second shut-off circuit, when the voltage of the electricity storage device exceeds the voltage of the electric power supply source.

5. The on-vehicle electric power source system as claimed in claim 1, wherein:

a voltage across the bypass line is a voltage level approximately identical to a voltage supplied from the electric power supply source; and a voltage across a portion of the charge-up line downstream of the booster circuit is higher than the voltage supplied from the electric power supply source.

6. The on-vehicle electric power source system as claimed in claim 1, wherein:

the electricity storage device comprises an electrical condenser.

7. The on-vehicle electric power source system as claimed in claim 1, wherein:

the electric power source control device is installed in the same vehicle compartment where the actuator is installed, and arranged near the actuator.

8. The on-vehicle electric power source system as claimed in claim 4, wherein:

a voltage across the bypass line is a voltage level approximately identical to a voltage supplied from the electric power supply source; and a voltage across a portion of the charge-up line downstream of the booster circuit is higher than the voltage supplied from the electric power supply source.

9. The on-vehicle electric power source system as claimed in claim 8, wherein:

the electricity storage device comprises an electrical condenser.

10. The on-vehicle electric power source system as claimed in claim 9, wherein:

the electric power source control device is installed in the same vehicle compartment where the actuator is installed, and arranged near the actuator.

11. The on-vehicle electric power source system as claimed in claim 4, wherein:

the electric power source control device and the actuator are connected to each other by means of a signal line, which is provided for outputting a signal indicating a state of the voltage of the electric power supply source to the actuator, and an electric-power line, which is provided for electric power supplies to the actuator.

12. An on-vehicle electric power source system for an automotive vehicle comprising:

an on-vehicle electric power supply source;

an actuator driven by an electric power from the electric power supply source; and a power source control device provided between the electric power supply source and the actuator for controlling an electric current to be supplied to the actuator, wherein the power source control device is further configured to supply the electric power from the electric power supply source to the actuator by means of a dual-circuit power supply device, the dual-circuit power supply device comprises at least a bypass device and a charge-up device arranged in parallel with the bypass device, a first shut-off device is disposed in the bypass device, whereas a booster device, an electricity storage device, and a second shut-off device are disposed in the charge-up device, the electricity storage device is provided for storing an electric power boosted up by the booster device, the charge-up device is connected to the bypass device in front and in rear of the first shut-off device, the electric power is supplied through the bypass device to the actuator during a startup of the electric power source system, and the electric power is supplied through the charge-up device to the actuator when a voltage of the electricity storage device exceeds a voltage of the electric power supply source.

13. The on-vehicle electric power source system as claimed in claim 12, wherein:

the electric power supply through the charge-up device is performed by blocking the first shut-off device and by establishing the second shut-off device.

14. The on-vehicle electric power source system as claimed in claim 13, wherein:

a voltage across the bypass device is a voltage level approximately identical to a voltage supplied from the electric power supply source; and a voltage across a portion of the charge-up device downstream of the booster device is higher than the voltage supplied from the electric power supply source.

15. The on-vehicle electric power source system as claimed in claim 12, wherein:

the electricity storage device comprises an electrical condenser.

16. The on-vehicle electric power source system as claimed in claim 15, wherein:

the electric power source control device is installed in the same vehicle compartment where the actuator is installed, and arranged near the actuator.

17. The on-vehicle electric power source system as claimed in claim 16, wherein:

the electric power source control device and the actuator are connected to each other by means of a signal line, which is provided for outputting a signal indicating a state of the voltage of the electric power supply source to the actuator, and an electric-power line, which is provided for electric power supplies to the actuator.

18. The on-vehicle electric power source system as claimed in claim 12, wherein:

the automotive vehicle is a hybrid vehicle configured to use both a power produced by the electric power supply source and a power produced by an engine;

the electric power source configured to start up the engine; and the electric power from the electric power supply source is outputted to a portion of the charge-up device between the electricity storage device and the second shut-off device.

19. A method of supplying an electric power, in an on-vehicle electric power source system, the method comprising:

providing a bypass line that connects an electric power supply source with an actuator;

providing a charge-up line, which is arranged in parallel with the bypass line and configured such that an electric power produced through the charge-up line is boosted up by a booster circuit;

disposing an electricity storage device in the charge-up line for storing the electric power boosted up by the booster circuit; and initiating an electric power supply through the charge-up line after termination of an electric power supply through the bypass line.

20. The method as claimed in claim 19, further comprising:

disposing a first shut-off circuit in the bypass line;

disposing a second shut-off circuit in the charge-up line downstream of the electricity storage device;

establishing the first shut-off circuit and blocking the second shut-off circuit at an operating mode where the electric power is supplied through the bypass line; and blocking the first shut-off circuit and establishing the second shut-off circuit at an operating mode where the electric power is supplied through the charge-up line.

* * * * *